United States Patent
Carter et al.

(10) Patent No.: US 7,340,971 B2
(45) Date of Patent: Mar. 11, 2008

(54) METHOD AND APPARATUS FOR INSPECTING A PALLET

(75) Inventors: Bill Carter, Los Alamitos, CA (US); Risto Salo, Valencia, CA (US)

(73) Assignee: Carter Industrial Automation, Inc., Los Alamitos, CA (US)

( * ) Notice: Subject to any disclaimer, the term of this patent is extended or adjusted under 35 U.S.C. 154(b) by 0 days.

(21) Appl. No.: 10/906,236

(22) Filed: Feb. 10, 2005

(65) Prior Publication Data

US 2006/0174719 A1    Aug. 10, 2006

(51) Int. Cl.
*G01M 19/00*    (2006.01)
(52) U.S. Cl. ..................................... 73/865.9
(58) Field of Classification Search ............... 73/865.9, 73/865.8
See application file for complete search history.

(56) References Cited

U.S. PATENT DOCUMENTS

| | | | |
|---|---|---|---|
| 4,462,746 A | 7/1984 | Smets | 414/330 |
| 4,743,154 A | 5/1988 | James et al. | 414/33 |
| 5,096,369 A | 3/1992 | Ouellette | 414/788.7 |
| 5,484,062 A | 1/1996 | Rich | 209/587 |
| 5,630,695 A | 5/1997 | McDonnell | 414/751 |
| 6,079,939 A | 6/2000 | Smets | 414/798.5 |
| 6,430,800 B1 | 8/2002 | Buck | 29/430 |
| 2002/0166395 A1 * | 11/2002 | Gatteschi | 73/865.8 |
| 2003/0210978 A1 | 11/2003 | Smets et al. | 414/798.9 |

FOREIGN PATENT DOCUMENTS

| | | | |
|---|---|---|---|
| DE | 3417181 C1 * | 12/1990 | |
| DE | 3916651 A1 * | 12/1990 | |
| DE | 19509800 C1 * | 10/1996 | |
| DE | 19952284 A1 * | 5/2001 | |
| DE | 20002989 U * | 7/2001 | |
| JP | 63231237 A * | 9/1988 | |
| JP | 08215644 A * | 8/1996 | |

* cited by examiner

*Primary Examiner*—Thomas P. Noland
(74) *Attorney, Agent, or Firm*—Holland & Hart LLP

(57) ABSTRACT

A system and method for inspecting pallets verifies a pallet meets dimensional and structural integrity requirements for transporting a load. The method and automated system verify that a pallet is within tolerances for dimensions, the load-bearing surface of the pallet is free from large voids or damage, and that the pallet is able to withstand stress associated with a load and with transport. Pallets are rejected when one or more defects are found in the pallet as determined by signals from various inspection stations generated in response to performance of structural tests on the pallet.

13 Claims, 18 Drawing Sheets

METHOD AND APPARATUS FOR INSPECTING A PALLET

FIELD OF THE INVENTION

The present invention is directed to a pallet inspection method and system and, more particularly, to a method and system to inspect dimensional, structural integrity, and load bearing characteristics of a pallet.

BACKGROUND

Pallets, and wooden pallets in particular, are commonly used to transport merchandise, equipment, or other loads in manufacturing, fabrication, warehousing, and distribution operations. Typical operations involve first loading a pallet with item(s), hereinafter referred to as a "load," that are to be transported. Once loaded, the pallets are moved by forklift trucks or similar machinery to a destination that may be the final destination for the load, or an intermediate destination for the load such as a holding area or a truck. As is well understood, it is common to move the pallet and associated load on multiple occasions when transporting a load from an origin location to a destination location. Generally, a pallet is unloaded at a final destination location, at which point it is generally desirable to re-use the pallet.

Given that pallets are commonly moved using heavy equipment, such as forklift trucks, damage to pallets is a common occurrence. Such damage may result from various causes, such as inserting the forks of the forklift truck in a manner that results in a fork hitting a side of the pallet, dropping a pallet, and running over a pallet, to name but a few. If a damaged pallet is re-used to transport another load, the likelihood that a failure of the pallet may occur increases significantly. Generally, such a failure results in economic loss. In order to avoid such a loss, a pallet may be inspected and repaired if damaged. However, such inspections, if performed, are often visual inspections performed by an individual on a pallet-by-pallet basis. If the individual performing the inspections notices damage to a pallet, the pallet is separated from other pallets for further evaluation that may result in the pallet being repaired or discarded.

While visual inspection is useful in determining visually damaged pallets, some damaged pallets may continue to be re-used even following a visual inspection. Such a damaged pallet may pass the visual inspection due to a number of reasons. For example, an individual performing an inspection may fail to notice a defect in a pallet. Additionally, the structural integrity of a pallet may be compromised without having a noticeable visible defect. For example, a pallet may have a cracked board that may not be readily visible during the visual inspection. When such pallets are re-used, they may fail when a load is placed on them. As mentioned above, such a failure may cause economic loss due to, for example, breakage of one or more items within the load, damage to item(s) loaded on surrounding pallets, damage to equipment near the pallet, and lost time and resources from the clean-up associated with the failure. Furthermore, an individual may be injured as a result of such a failure of a pallet.

SUMMARY OF THE INVENTION

The present invention provides a system and method for inspecting pallets to verify the pallet meets dimensional and structural integrity requirements. The system and method verify that a pallet is within tolerances for dimensions, the load-bearing surface of the pallet is free from large voids or damage, and that the pallet is able to withstand stress associated with a load and with transport.

In one embodiment, pallet inspection apparatus is provided that performs inspection of a pallet. The pallet inspection apparatus of this embodiment comprises: (a) a mounting plate operable to be positioned in proximity to a pallet; (b) a plurality of detectors mounted to the mounting plate and, when the mounting plate is in proximity to the pallet, operable to analyze at least a portion of a surface of the pallet and generate an electrical indication of a state of the detector; and (c) a signal generator electrically connected to the plurality of detectors and operable to receive the electrical indication and generate a signal indicative of a defective pallet when the electrical indication indicates that there is a defect in the pallet surface. The pallet inspection system may further include (d) a pallet input conveyer operable to receive a pallet to be inspected and transport the pallet to a location for inspection; and (e) at least first and second clamp members located on opposite sides of the conveyer and in alignment with the mounting plate, wherein at least one of the first and second clamp members is operable to engage a pallet and align the pallet in a predetermined position relative to the mounting plate.

The detectors, in one embodiment, each comprise a probe operable to telescope within an inductive sensor. The probe is biased within the inductive sensor such that when the probe contacts the pallet surface, the probe is forced against the bias into the inductive sensor, and the inductive sensor generates an electrical indication in response thereto. The mounting plate may move in relation to the pallet to substantially simultaneously engage at least a portion of the sensors with the surface of the pallet. The mounting plate, in an embodiment, substantially completely covers the surface of the pallet, and the sensors are arranged on the mounting plate to detect defects in the surface of the pallet that are greater than a predetermined size. The predetermined size of defect may be selected based on the sensor arrangement, and in one embodiment is about 2 square inches.

The pallet inspection system may also be used to determine if the pallet has dimensions that are out of tolerance. For example, the sensors may be placed to detect if the pallet is out of square, to detect obstructions in a forklift slot of the pallet, and/or to detect protrusions from a top surface of the pallet. Dimensions of the pallet may also be verified as meeting tolerances while actuators located at alternate corners of the pallet, beneath the pallet, and/or above the pallet are applying force to the pallet.

In another embodiment, the present invention provides a method for inspecting a pallet. The method comprises the steps of: (a) positioning a pallet in an inspection station; (b) examining the pallet at the inspection station, the inspection station generating a signal indicative of a condition of the pallet; and (c) analyzing the signal to determine if a defect is present in the pallet. Positioning the pallet, in an embodiment, includes receiving the pallet at a conveyer; conveying the pallet to the inspection station; and aligning the pallet within the inspection station. When aligning the pallet, a clamp may be actuated to secure the pallet in a predetermined position.

The examining step of an embodiment comprises: engaging a plurality of sensors with a surface of the pallet; and receiving a signal from each of the sensors indicative of a state of the surface. The plurality of sensors may be mounted to a mounting panel, with each of the sensors contacting the surface of the pallet substantially simultaneously. The plurality of sensors, in an embodiment, each comprise a probe operable to telescope within an inductive sensor, the probe biased such that when the sensor contacts the surface, the probe is forced against the bias into the inductive sensor, and the inductive sensor generates a signal in response thereto.

Yet another embodiment provides an inspecting step that comprises: securing the pallet within the inspection station; applying a load to a top surface of the pallet; and generating a signal indicative of a height of the pallet during the applying step. The inspecting step may also comprise: securing the pallet within the inspection station; applying a load laterally to at least a first corner of the pallet; and generating a signal indicative of a dimensional change of the pallet during the applying step. Yet another embodiment provides an inspecting step that comprises: securing the pallet within the inspection station; optically sensing at least one dimensional attribute of the pallet; and generating a signal indicative of the dimensional attribute. The dimensional attribute may comprise a length and width of the pallet, a height of at least a portion of the pallet, and an obstruction in a fork lift slot of the pallet.

DETAILED DESCRIPTION

The present invention provides a pallet inspection method and system. A pallet to be inspected is received and inspected for defects in a load bearing surface. If a defect greater than a predetermined size is discovered, the pallet is rejected. If no defects are discovered that have a size greater than the predetermined size, the pallet is inspected for proper dimensions related to height, width, and length. If any dimensions of the pallet are outside of preset tolerance limits, the pallet is rejected. If the pallet passes the dimensional tests, the pallet is then stressed with forced typical of a full load, and forces typical of stresses that may be present during transport. If the pallet loses proper dimensions while undergoing the stress tests, the pallet is rejected. If the pallet passes the stress tests, the pallet is moved to an output area associated with pallets that have passed inspection. Pallets that fail any test are moved to an output area associated with failed pallets, where they may then be repaired, re-inspected, and/or discarded.

Figure 1:
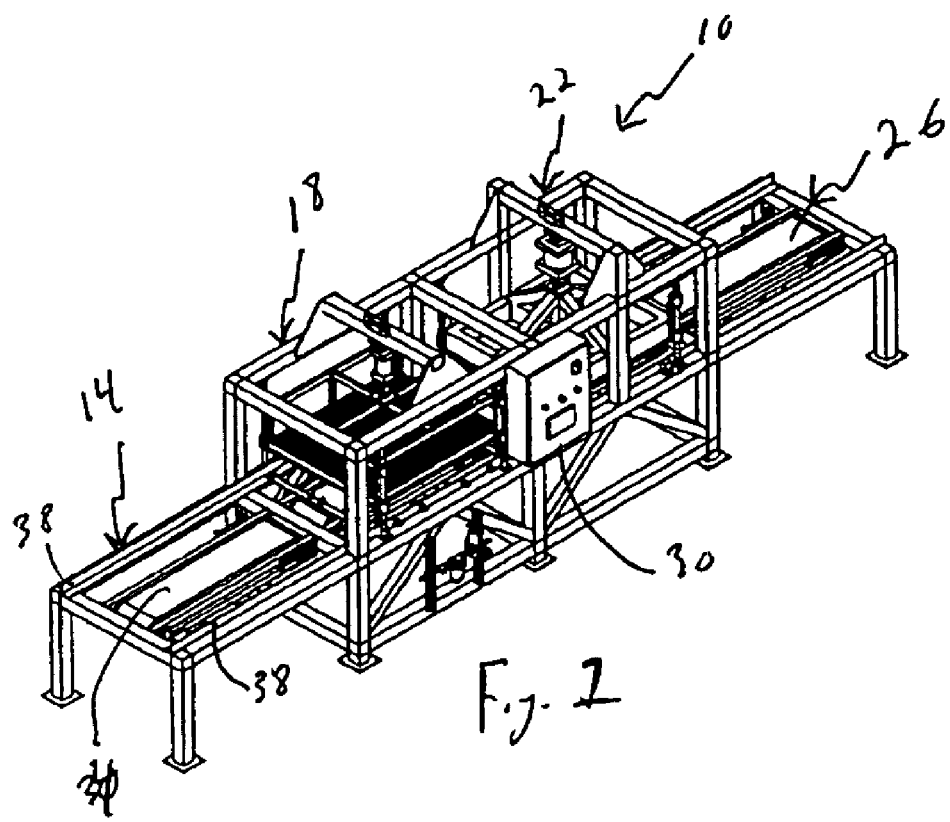
FIG. 1 is a perspective view of a pallet inspection system of an embodiment of the present invention.
Figure 2:
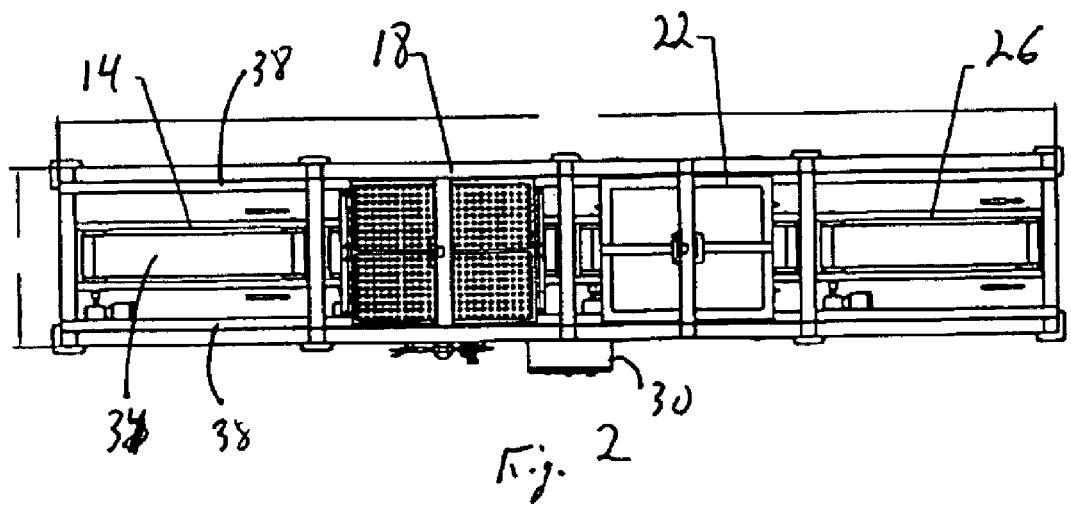
FIG. 2 is a top plan view of a pallet inspection system of an embodiment of the invention.
Figure 3:
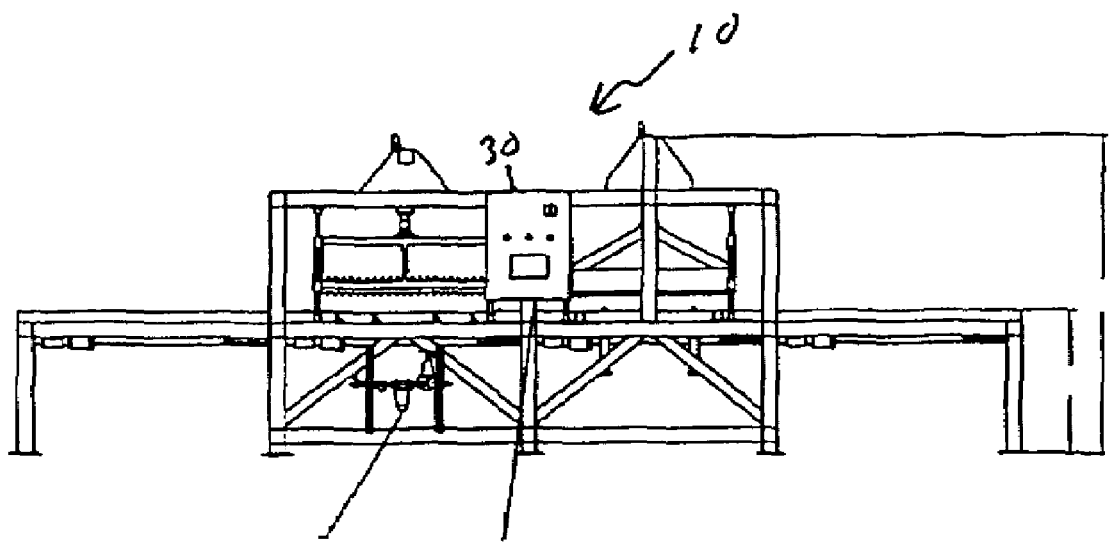
FIG. 3 is a side elevation view of a pallet inspection system of an embodiment of the invention.
Figure 4:
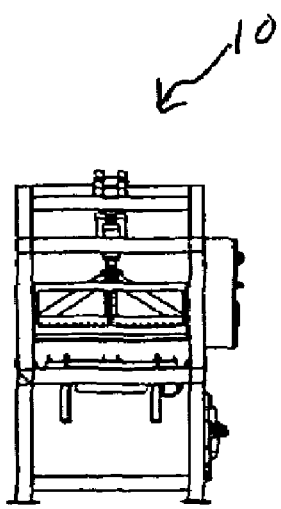
FIG. 4 is an end elevation view of a pallet inspection system of an embodiment of the invention.

Having generally described the invention, various embodiments of the invention are now described in greater detail. A pallet inspection system 10 of one embodiment of the present invention is illustrated in FIGS. 1-4. FIG. 1 is an isometric view, FIG. 2 is a top plan view, FIG. 3 is a side elevation view, and FIG. 4 is an end elevation view of the pallet inspection system 10 of this embodiment. The pallet inspection system 10 comprises a receiving station 14, a void check station 18, a structural test station 22, and a sorting station 26. The pallet inspection system 10 is operated using a control panel 30.

In one embodiment, the pallet inspection system 10 is designed to inspect pallets having a standard size. Various organizations have drafted specifications relating to requirements for wood pallets, including American Society of Mechanical Engineers/American National Standards Institute (ASME/ANSI) standard AMSE MH1, International Standards Organization (ISO) standard 6780, and the National Wood Pallet and Container Association (NWPCA) Uniform Standard for Wood Pallets. Additionally, various manufacturers may use pallet dimensions that do not conform to any particular standard but are beneficial for other business reasons, such as a particularly heavy load, and/or unique storage or transport requirements. As will be understood, the present invention may be used to inspect any size pallet, so long as the pallets have known load and dimensional requirements. Furthermore, in an embodiment, the pallet inspection system 10 may be used with pallets having differing dimensional requirements, as will be described in further detail below. In the embodiment, of FIGS. 1-4, the pallet inspection system 10 is designed to inspect pallets having a length of 40 inches, a width of 48 inches and a height of 5 inches. In this embodiment, each pallet is also required to carry a load of 4000 pounds. The pallets have a top surface onto which a load may be placed, and a bottom portion having forklift slots into which forklift forks may be inserted.

The receiving station 14, in the embodiment of FIGS. 1-4, has a conveyer belt 34 that is operable to receive a pallet and convey the pallet to the void check station 18. As will be understood, any suitable system may be used to transport a pallet at the receiving station 14 into the void check station 18 such as, for example, rollers, rails, multiple conveyer belts, and any combination thereof, to name but a few. The receiving station 14 also includes pallet alignment rails 38 that guide a pallet into the void check station 18 with a proper alignment. Pallets may be delivered to the receiving station 14 in any of a number of available manners that provide a pallet in the proper orientation and in-line with the receiving station 14. In one embodiment, pallets are provided to the receiving station 14 having the top surface facing up.

The delivery system may include, for example, a conveyer system, a pallet stacking and de-stacking system, and manual movement of pallets, to name but a few. When received at the receiving station 14, a pallet is engaged by the pallet alignment rails 38 and the conveyer belt 34. In one embodiment, the guide rails 38 include opposing 'L' shaped rails that are separated by a distance of 48 inches. In this manner, the pallets, having a width of 48 inches, are aligned properly for entry into the void check station 18. In other embodiments, the guide rails 38 are separated by a slightly larger distance than 48 inches in order to provide additional tolerance for pallets that may be wider than 48 inches, but still within the tolerances for the pallet specification. In still other embodiments, the pallet alignment rails 38 are separated by a distance that is suited for the size pallet being inspected by the pallet inspection system 10. The pallet alignment rails 38 may also be adjustable to accommodate pallets of varying sizes. Such an adjustment may be made using any of a number of adjustment mechanisms that would allow an adjustment in pallet alignment rails 38 spacing, such as, for example, lateral support members having pre-drilled holes operable to engage pins on the pallet alignment rails 38.

Following an inspection at the void check station 18, a pallet is transported to the structural test station 22. Alternatively, the pallet may be transported through the structural test station 22 and to the sorting station 26 where it is then transported to an acceptance station (not shown) or a rejection station (not shown). The structural test station 22 may be bypassed when, for example, the pallet fails the void check inspection or when a structural test is not desired to be performed. When a structural test is performed, the structural test station 22 performs a structural test that will be described in more detail below, and the pallet is transported to the sorting station 26 where it is then sorted and transported to the appropriate acceptance or rejection station. In some embodiments, a pallet that is moved to the rejection station may be repaired, and may be again delivered to the receiving station 14 where one or more of the inspections may be performed on the repaired pallet.

Figure 5:
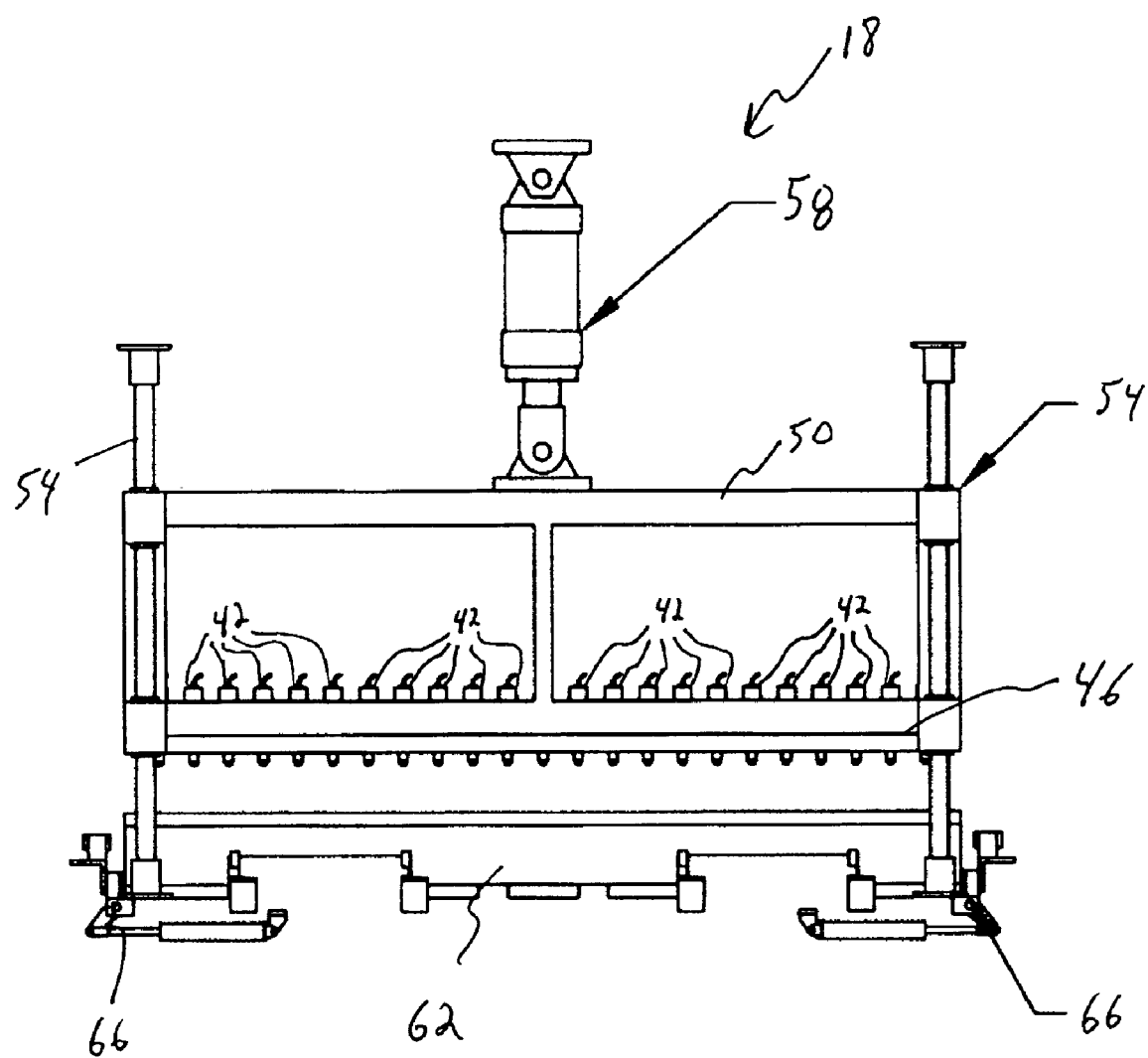
FIG. 5 is an elevation view of a void check station of an embodiment of the invention.
Figure 6:
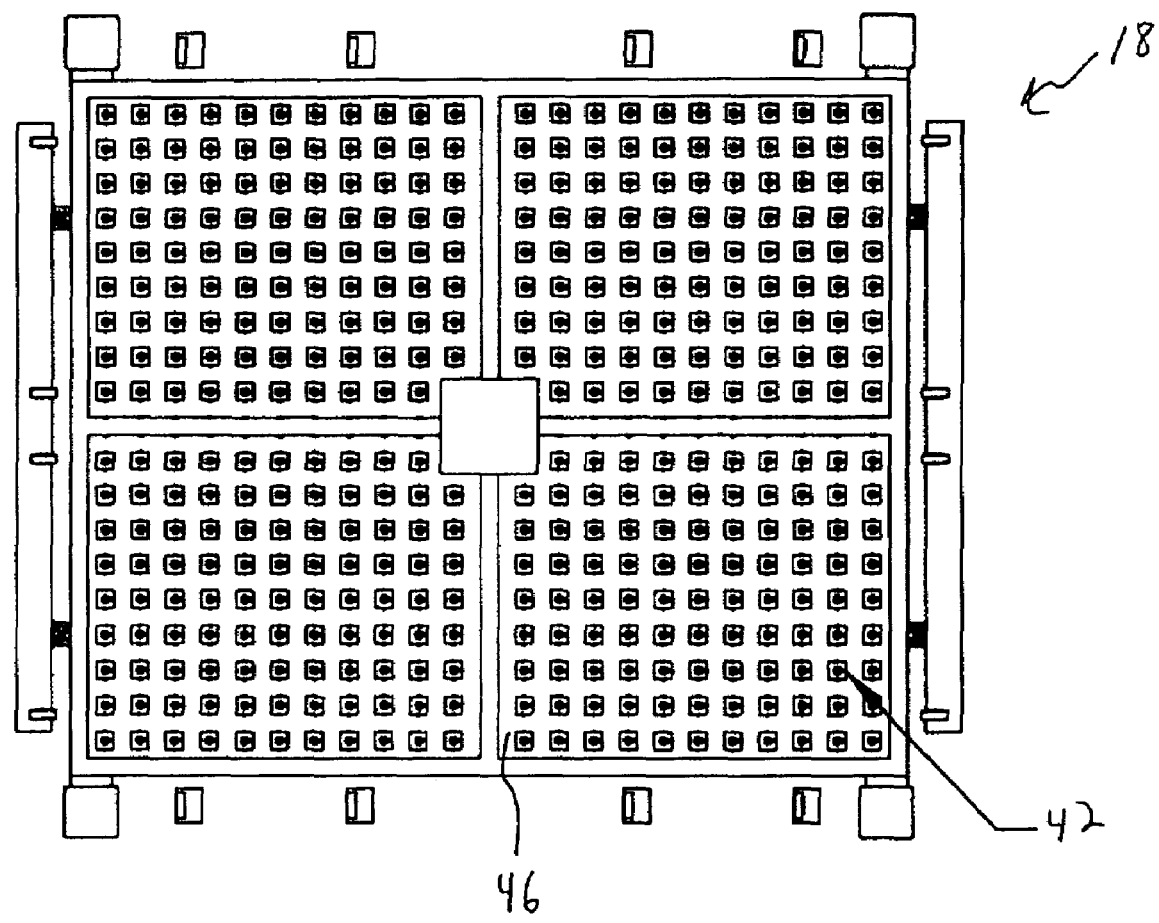
FIG. 6 is a top plan view of a void check station of an embodiment of the invention.

As mentioned, a pallet moves from the receiving station 14 to the void check station 18. The void check station 18, inspects the top surface of a pallet for voids that may be indicative of a pallet that may not properly support a load. A void check station 18 of one embodiment is illustrated in FIGS. 5 and 6, FIG. 5 being a side elevation view and FIG. 6 being a top plan view. In this embodiment, the void check station 18 includes a plurality of contact sensors 42 that are mounted on a mounting plate 46. The mounting plate 46 is secured to a mounting frame 50 that is slidably secured at each corner to a guide rail 54. The mounting frame 58 is also connected to an actuator 58. The actuator 58 is pneumatically operated to move the mounting frame 50 up and down along the guide rails 54 in order to bring the contact sensors 42 into contact with a pallet 62 to be inspected. In the embodiment, of FIG. 5, the pallet 62 is secured in the void check station 18 with four clamps 66 located at each corner of the pallet 62. When the pallet 62 is moved into the void check station, the clamps 66 actuate to lift the pallet from the conveyer and to secure the pallet 62 in proper alignment with the mounting plate 46 and contact sensors 42. The clamps 66, in this embodiment are pneumatically operated. As described above, the actuator 58 and clamps 66 are pneumatic devices, though may be operated using other means, including hydraulic and electromagnetic.

Figure 7:
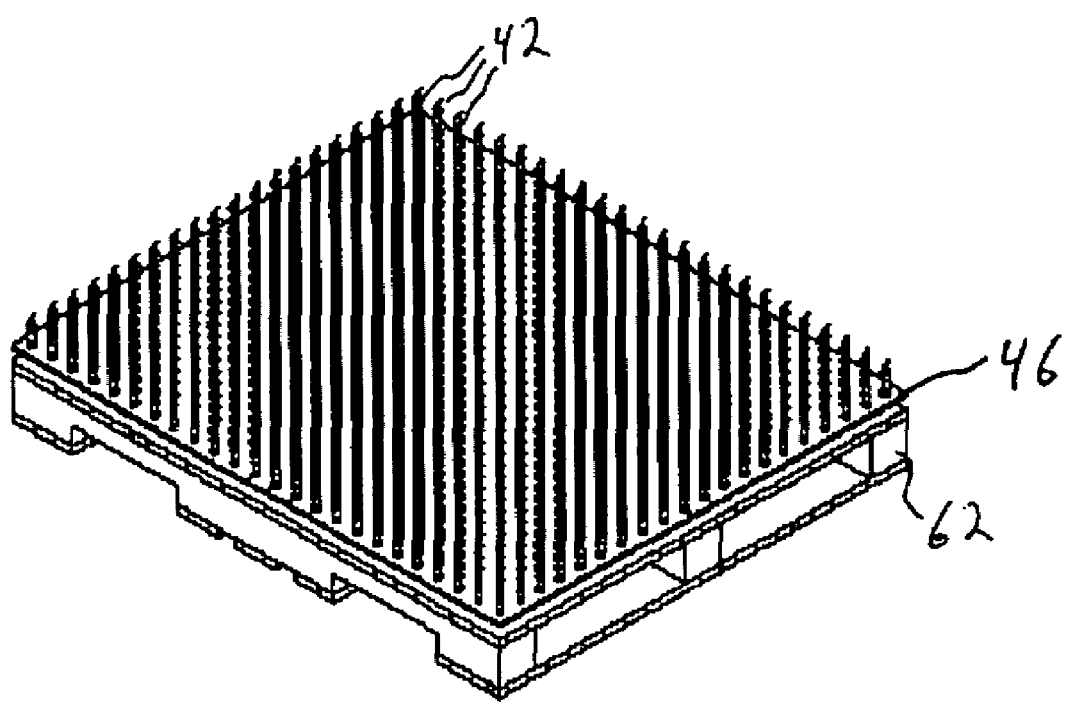
FIG. 7 is an isometric view of void contact sensors in relation to a pallet top surface of an embodiment of the invention.
Figure 8:
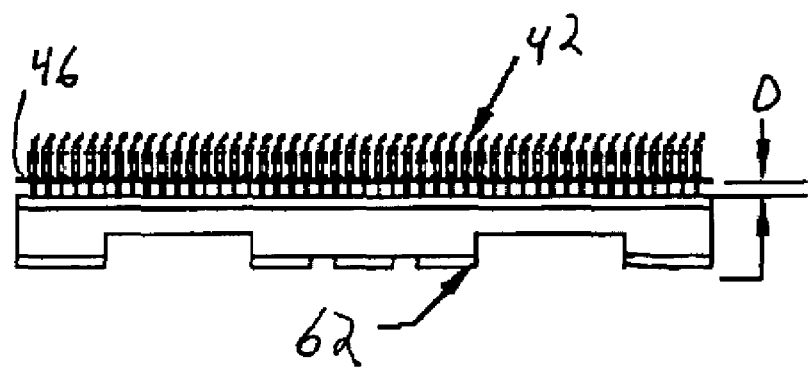
FIG. 8 is a elevation view of void contact sensors in relation to a pallet top surface of an embodiment of the invention.
Figure 9:
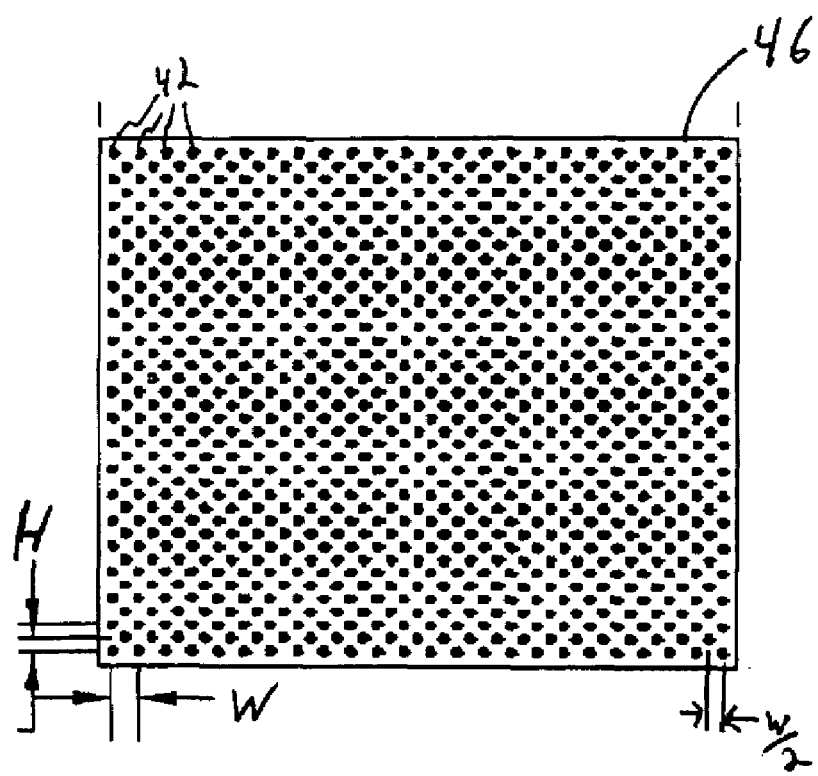
FIG. 9 is a top plan view of void contact sensors and a mounting plate of an embodiment of the invention.

Referring now to FIGS. 7-9, the interaction of the contact sensors 42 with a pallet 62 is now is described. As illustrated in FIGS. 7 and 8, the mounting plate 46 is approximately the same size as the pallet 62. The contact sensors 42 contact the pallet 62 top surface when the mounting plate 46 is moved toward the pallet 62. In the embodiment of FIGS. 7 and 8, the actuator 58 moves the mounting plate to be a distance D from the top surface of the pallet 62. At this distance, the contact sensors 42 contact the top surface of the pallet 62, thus causing the sensors 42 to be actuated and to generate an electrical signal. While the illustrations of FIGS. 7 and 8 show the mounting plate 46 and sensors 42 being moved toward the pallet 62, the mounting plate may also be situated in a static position relative to the void check station 18, and the pallet 62 may be moved into contact with the sensors 42 with an associate actuator.

The presence or absence of an electrical signal from one or more sensors 42 is indicates a void or other damage in the top surface of the pallet 62 may be present. In one embodiment, the control panel 30 (FIG. 1) receives the signal from each sensor 42 and generates an appropriate signal indicating that the pallet 62 is defective. The generation of the signal may be performed using either hardware or software. For example, the contact sensors 42 may generate an electrical signal when they are not in contact with the pallet 62 top surface. In this manner, if any electrical signal is present when the mounting plate 46 is moved into the appropriate position relative to the pallet 62, this indicates that a defect is present, and a signal is generated from the control panel 30 indicating the pallet 62 is defective. The contact sensors 42 and determination of a defect in the pallet top surface will be described in more detail below.

Referring now to FIG. 9, the placement of sensors 42 of an embodiment is now described. In this embodiment, the sensors 42 are mounted to the mounting plate 46 in a series of rows. Sensors 42 within a row are mounted to the mounting plate 46 at a distance W from each other, and rows are spaced at a distance of H from other rows. Sensors in alternate rows are offset by W/2. In one embodiment, H is equal to W/2, and in this manner, the maximum size of a void or defect that can avoid detection has a radius of H.

Figure 10:
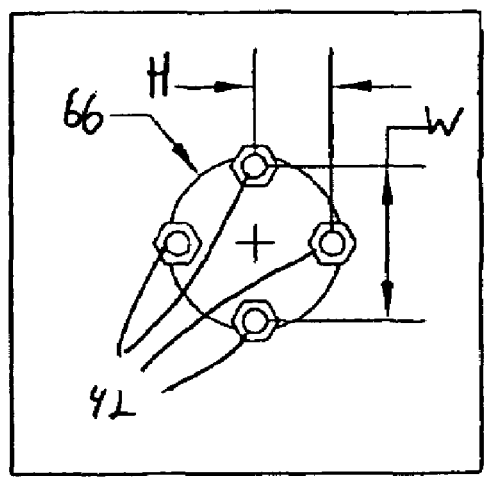
FIG. 10 is an illustration of a void in a pallet top surface in relation to void contact sensors of an embodiment of the invention.

Referring now to FIG. 10, an illustration of the maximum sized void that can avoid detection is described. In this illustration, a void 66 in a pallet top surface has a circular shape with a radius of H. In the event that the void 66 is centered on a row and between sensors 42 on that row, each of the four sensors 42 adjacent to the void 66 will contact the top surface of the pallet immediately adjacent to the void 66, and thus the void 66 avoids detection. As can be seen from this illustration, in the event that the void 66 is positioned slightly off-center from either the row or the two adjacent sensors 42 within that row, one of the sensors 42 will detect that the void 66 is present. Similarly, if the void 66 were elliptical with a major axis substantially parallel to the row, the void will also be detected. In one embodiment, the void detector 18 generates an indication that the pallet is defective when one sensor 42 indicates that a void is present. In another embodiment, the void detector 18 generates an indication that the pallet is defective when two or more adjacent sensors 42 from adjacent rows, or within a row, indicate that a void is present. In a further embodiment, the pattern of sensors 42 detecting a void may be evaluated, and the pallet is indicated as defective when the pattern does not correspond to a predefined pattern of allowable voids. In this manner, if an entire row of sensors detects a void, this may indicate a gap in the boards forming the top surface. If such a gap does not extend beyond a predetermined width, it is assumed that the void in the surface is such a gap between boards, and is not a void indicative of a defect in the pallet. Such pattern detection, as will be understood, would be applicable to pallets having known openings in the pallet top surface, such as pallets having a top surface made of several boards assembled such that there is a space between boards. In embodiments having pattern detection, the pattern detection may be implemented using hardware and/or software logic to evaluate the number and pattern of sensors detecting voids.

Figure 11:
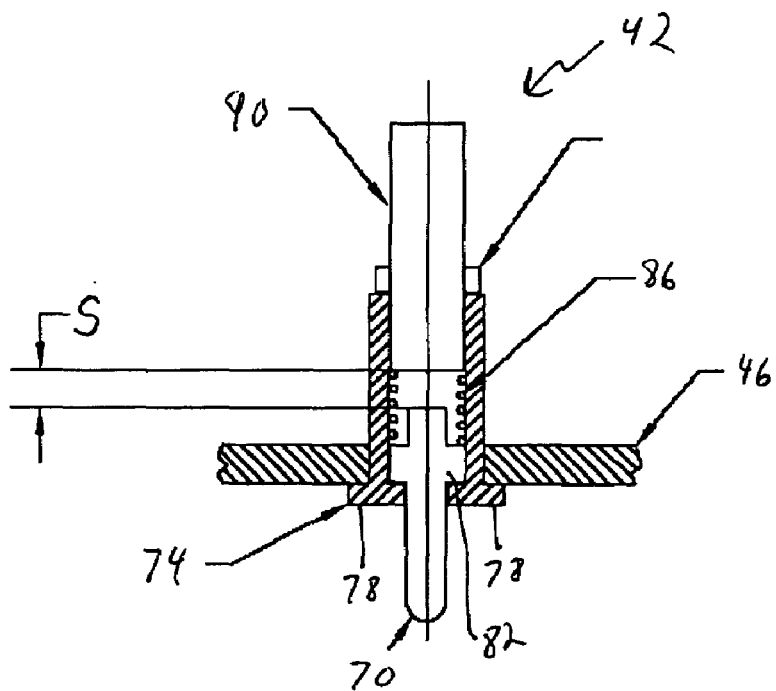
FIG. 11 is a cross-sectional illustration of a contact sensor of an embodiment of the invention.

Referring now to FIG. 11, a contact sensor 42 of one embodiment of the present invention is illustrated. In this embodiment, the contact sensor 42 comprises a probe tip 70 is placed in a shaft 74 that includes a flange 78 that extends beyond the shaft 74 walls to allow for mounting to the mounting plate 46. The probe tip 70 includes a flange 82 that contacts the shaft flange 78, and a biasing spring 86. The biasing spring 86 maintains pressure on the probe flange 82 to keep the probe flange 82 in contact with the shaft flange 78 until sufficient pressure is placed against the probe tip 70 to overcome the biasing force of the biasing spring 86. An inductive sensor 90 within located at an upper end of the shaft 74 detects the movement of the probe tip 70 and generates an electrical signal indicating that the contact sensor 42 is in contact with the top surface of the pallet 62. The inductive sensor 90 is secured to the shaft 74 with a locking nut 94 in the embodiment of FIG. 11. As will be understood, the inductive sensor 90 is one of many types of sensors that may be used in such an application to generate a signal when the probe tip 70 moves into the shaft.

In one embodiment, the force needed to overcome the biasing force of the biasing spring 86 is about one pound. However, the amount of force needed to overcome the biasing force of the biasing spring may be more or less than one pound, with the amount of force required selected based upon the application. For example, the amount of force required to result in the probe tip 70 moving may be selected such that a defect in the top surface of the pallet that may not be visually detected is likely to be detected in the void check station 18. Such a defect may be detected due to the amount of force required to move the probe tip 70. For example, if the top surface of the pallet is cracked or otherwise compromised, a contact sensor 42 having a biasing spring 86 with low biasing force may not detect that there is a defect. However, if the contact sensor 42 is selected to have a biasing spring 86 with a relatively high biasing force, the cracked top surface is less likely to place enough force on the probe tip 70 to overcome the biasing force, thus resulting in the detection of a defect. Similarly, the biasing spring 86 may be selected to have a sufficient biasing force to give a high confidence that, if a top surface board is cracked and maintains enough structural integrity to overcome the biasing force, there will be little risk of having a failure when a load is placed on the pallet.

Figure 12:
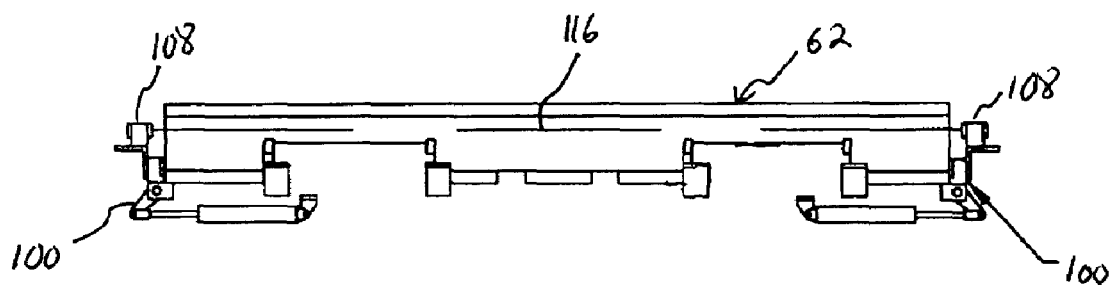
FIG. 12 is an elevation view of a square-in-plan test station of an embodiment of the invention.

Following the inspection at the void check station 18, a pallet is transported to the structural test station 22, where one or more structural tests are conducted to verify the structural integrity of the pallet. Referring now to FIG. 12, the structural test station 22 of an embodiment is now described. In this embodiment, the structural test station 22 performs a number of tests on a pallet 62 to verify the structural integrity of the pallet 62. These tests include a square in plan test to detect defects in the dimensions of the pallet, a flatness of the top surface test to detect protrusions from the top surface of the pallet, a forklift slot clearance test, and various load tests to verify that the pallet is able to carry a sufficient load with a low likelihood of failure.

Figure 13:
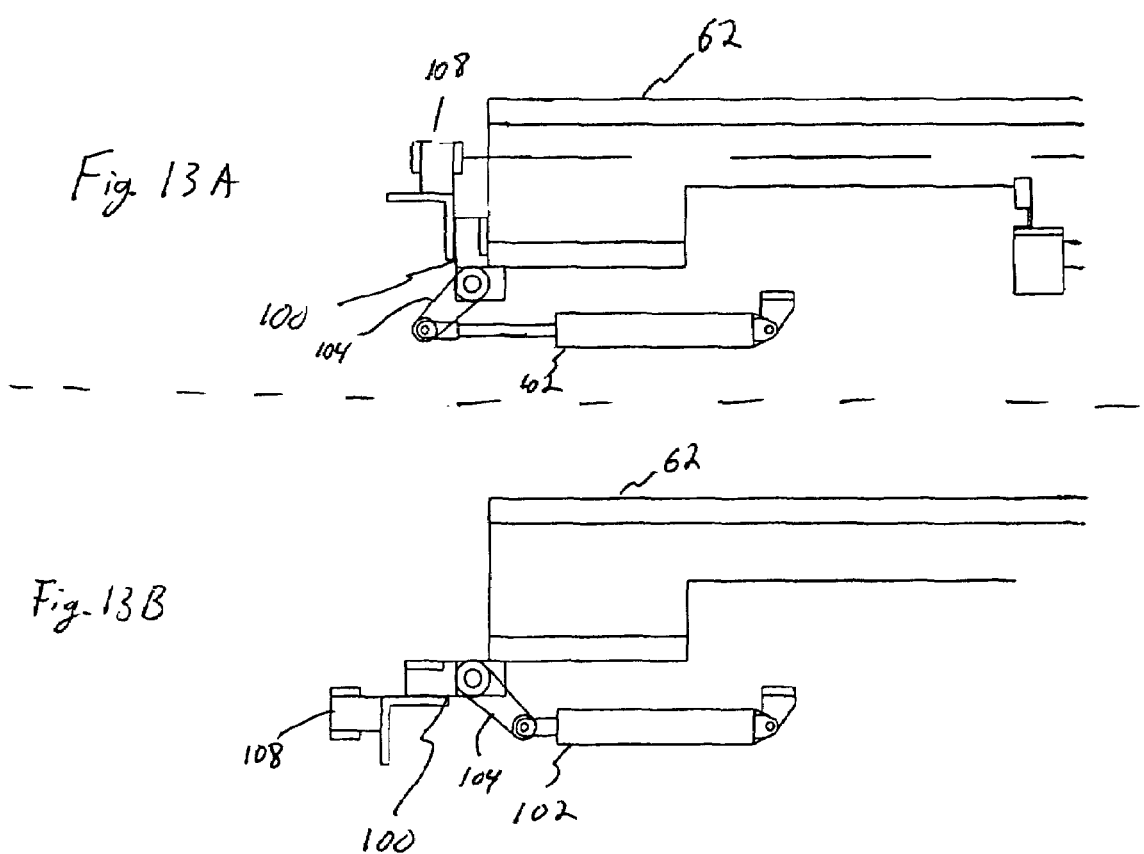
FIG. 13A is a detail elevation view of a pneumatic clamp in a locked position for securing a pallet in an inspection station of an embodiment of the invention.
FIG. 13B is a detail elevation view of a pneumatic clamp in an unlocked position for securing a pallet in an inspection station of an embodiment of the invention.

In the embodiment of FIG. 12, the structural test station 22 includes pneumatic clamps 100 to secure a pallet 62 within the station 22. FIGS. 13A and 13B illustrate the pneumatic clamps 100 of this embodiment. When the pallet 62 is received in the station 22, the clamps 100 are initially in an unlocked position illustrated in FIG. 13B. A clamp actuator 102 is connected to a swing arm 104 connected to the clamp 100 and an optical sensor 108. As used herein, the terms swing arm and mounting plate are used interchangeably to describe a surface or structure to which a sensor is mounted. When the clamp actuator 102 is moved into a locked position, illustrated in FIG. 13A, the swing arm 104 moves the clamp 100 into contact with the pallet 62 securing the pallet 62 within the structural test station and also moves the optical sensor 108 into position to detect structural protrusions of the pallet 62 that will be described in further detail below. Referring again to FIG. 12, the structural test station 22 includes a number of optical sensors 108 mounted to swing arms or mounting plates that are used to verify dimensions of the pallet 62. In this embodiment, all of the optical sensors 108 are mounted on swing arms or mounting plates similarly as described with respect to FIG. 13, that move the optical sensors 108 into the proper position when the pneumatic clamps 100 are actuated to secure the pallet 62 within the station 22. In this manner, the sensors 108 may be moved out of the path of a pallet when the pallet is moved into and out of the structural test station 22. Similarly, the sensors 108 within the structural test station 22 may be mounted such that they are static with respect to the station 22, and the pallet 62, after being transported to the structural test station may be moved by an actuator into an appropriate position for inspection.

Figure 14:
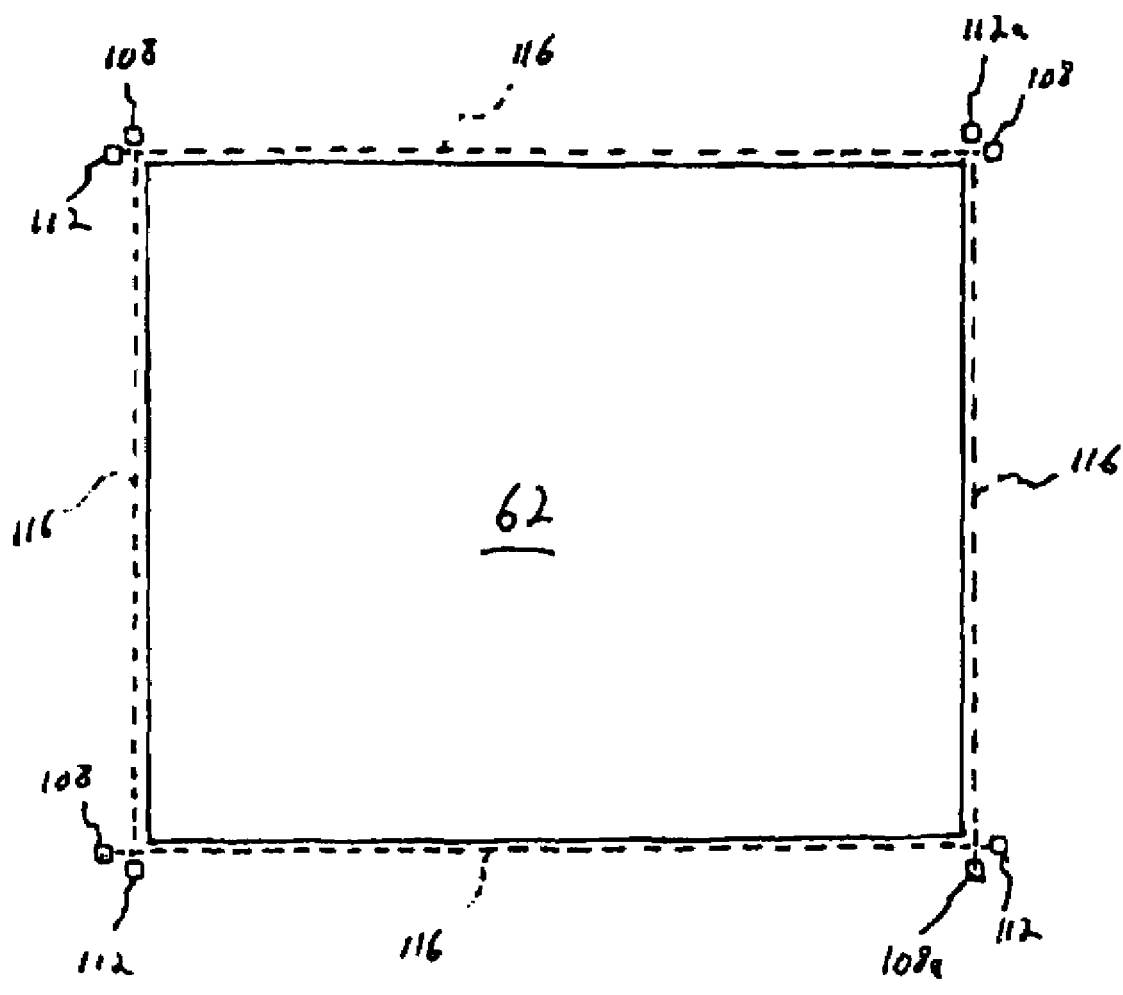
FIG. 14 is an illustration of a square pallet in relation to a plurality of square-in-plan sensors of an embodiment of the invention.
Figure 15:
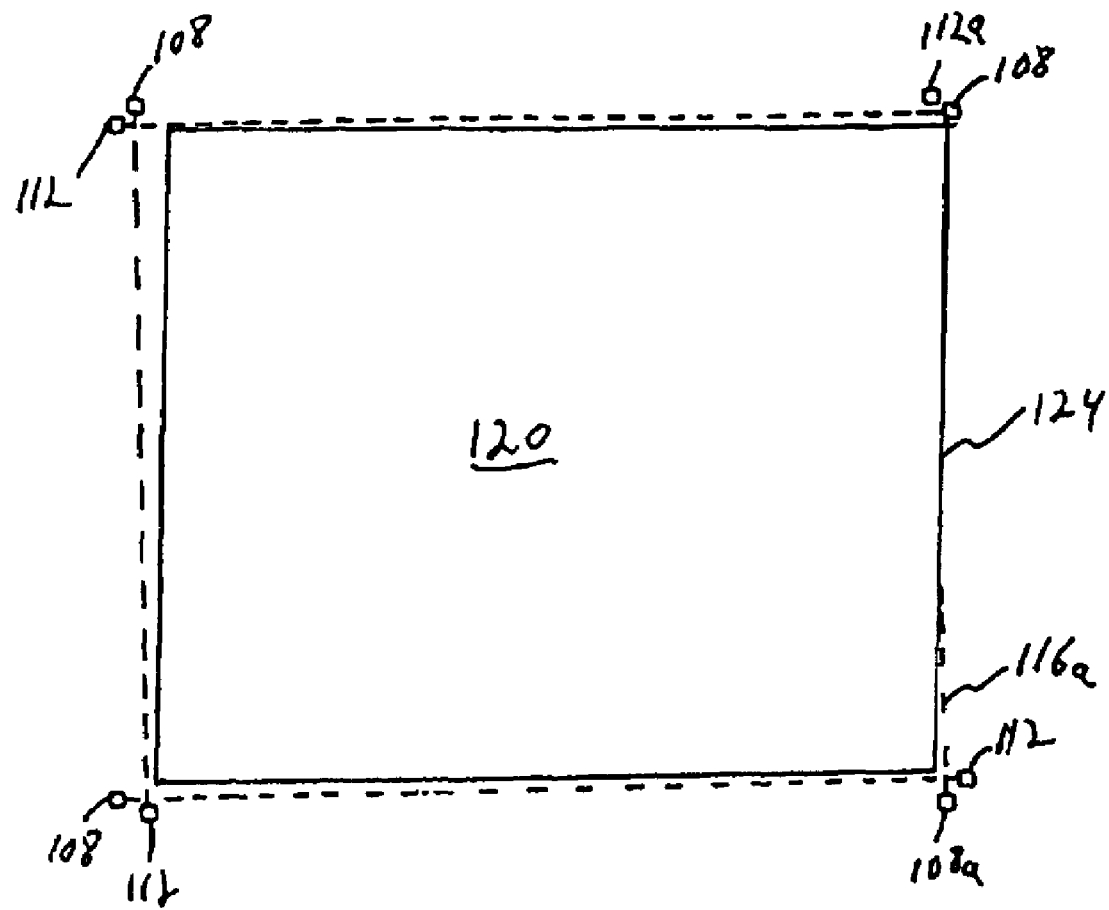
FIG. 15 is an illustration of a non-square pallet in relation to a plurality of square-in-plan sensors of an embodiment of the invention.
Figure 16:
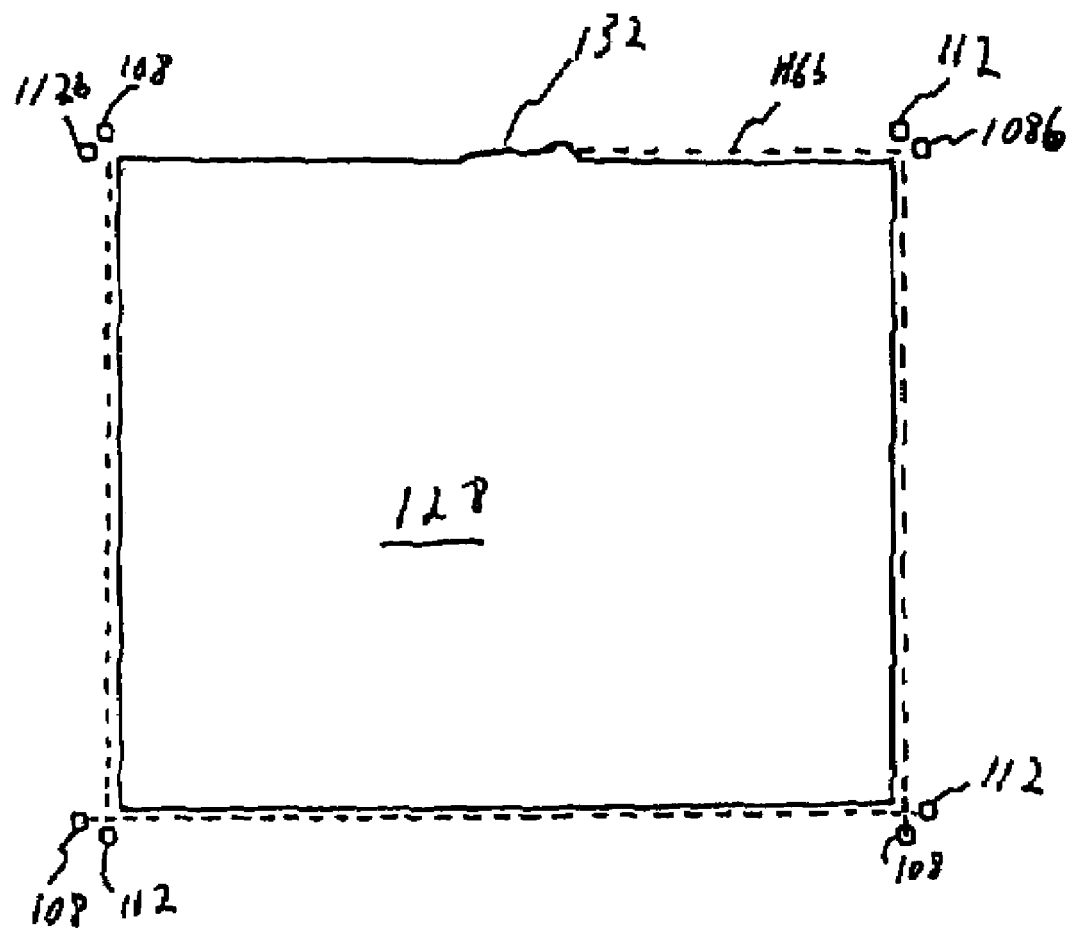
FIG. 16 is an illustration of a defective pallet in relation to a plurality of square-in-plan sensors of an embodiment of the invention.

With reference now to FIGS. 14-16, a square-in-plan test is performed on a pallet 62. In this embodiment, the structural test station 22 includes optical sensors 108 placed at each corner of the pallet 62 used to measure the square of the pallet 62. In this embodiment, the optical sensors 108 are photoelectric beam sensors that may be moved into position for inspection as described with respect to FIG. 13. The pallet square is verified in this embodiment by placing the optical sensors 108 at a predetermined distance from the nominal location of the edges of a pallet 62 that conforms to predefined dimensions. As illustrated in FIG. 14, optical sensors 108 are placed at each corner of a pallet 62. As mentioned, the optical sensors 108 in this embodiment are photoelectric beam sensors having an emitter and receiver pair for each sensor. In this embodiment, a receiver 112 is placed opposite each optical sensor emitter 108. Each optical sensor emitter 108 generates a beam 116, that is received at the receiver 112. In the embodiment of FIGS. 14-16, the optical sensor emitter/receiver pairs 108, 112 are placed such that a pallet 62 will break a beam 116 when any portion of the pallet 62 along the beam path is more than ¼ inch from the position of a square pallet.

A square pallet 62 is illustrated in FIG. 14. In the illustration of FIG. 14, each of the beams 116 is unobstructed by the pallet 62, and thus the pallet 62 is determined to be within appropriate square limits. As used herein, the term "square" refers to the shape of the pallet as having right angles at each corner and straight lines between each corner. Thus, a pallet of this embodiment would be determined as not in square when the angle of one or more corners deviates from 90 degrees by a sufficient amount to block one or more of the beams 116 generated from an optical sensor emitter 108. An illustration of a non-square pallet 120 is illustrated in FIG. 15. In the illustration of FIG. 15, the pallet 120 has corners that are sufficiently different from 90 degrees to result in a pallet edge 124 that breaks a beam 116a. Thus, optical sensor emitter/receiver pair 108a, 112a, in this embodiment, would generate a signal indicating that the beam 116a has been broken, and indicating that the pallet 120 is defective. Similarly, as illustrated in FIG. 16, a pallet 128 may have a protrusion 132 in one side. In the illustration of FIG. 16, the protrusion 132 extends out to a point that a beam 116b from optical sensor emitter 108b is broken and not received at receiver 112b. In this example, the optical sensor emitter/receiver pair 108b, 112b would generate a signal indicating the beam 116b has been broken and indicating that the pallet 128 is defective.

Figure 17:
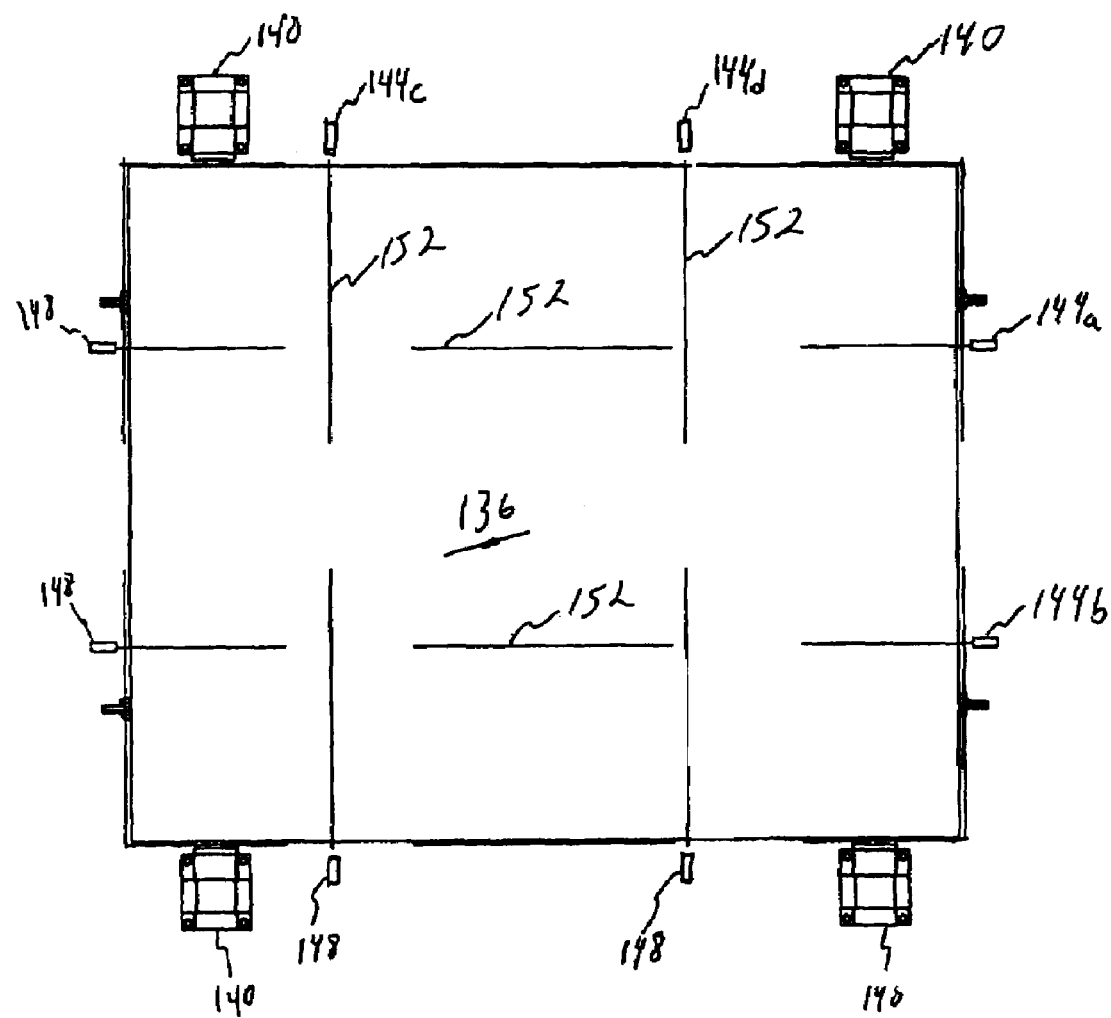
FIG. 17 is a top plan view of pallet top surface inspection sensors of an embodiment of the invention.
Figure 18:
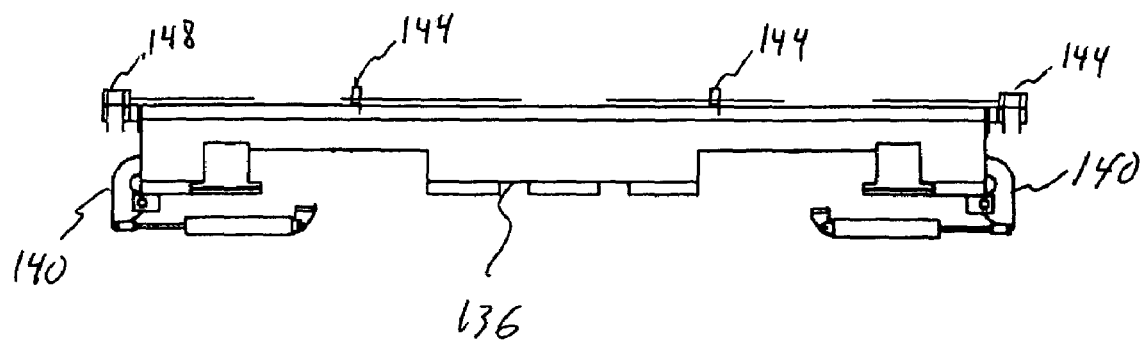
FIG. 18 is a side elevation view of pallet top surface inspection sensors of an embodiment of the invention.

Referring now to FIGS. 17 and 18, a flatness of the pallet top surface test is performed. In this embodiment, the pallet 136 is secured in place by pneumatic clamps 140 located at four corners of the pallet 136, and the pallet 136 top surface is checked for flatness using a number of optical sensors 144. In this embodiment, four optical sensors 144 are positioned to detect protrusions in the top surface of the pallet 152. As best illustrated in the top plan view of FIG. 17, two of the sensors 144a, 144b positioned to detect protrusions in a lateral direction, and the other two sensors 144c, 144d, positioned to detect protrusions in a longitudinal direction. Similarly as described above, with respect to the square in plan optical detectors 108, the optical detectors 144 are, in the embodiment of FIGS. 17-18, photoelectric beam sensors, and therefore a receiver 148 is placed opposite each optical sensor emitter 144. Each optical sensor emitter 144 generates a beam 152, that is received at the receiver 148. If any portion of the pallet 136 top surface that is along a beam 152 path protrudes up to or above the plane of the beam 152, the receiver 148 associated with the blocked beam 156 will not receive the beam, and the optical sensor emitter/receiver pair 144, 148 will generate an electrical signal indicating a defect in the pallet 136 top surface.

In one embodiment, the associated optical sensor emitter/receiver pairs 144, 148 are positioned such that a protrusion of ¼ inch or greater will be detected. As will be understood, any type of appropriate detector may be used to detect protrusions in the top surface, including, but not limited to, laser detectors, CCD detectors, and other optical detectors covering the ultraviolet, visible, and infrared portions of the electromagnetic spectrum. Furthermore, the number of optical detectors 144 used may be adjusted based upon the application and the sensitivity to protrusions of the pallet top surface. For example, a relatively large number of optical detectors may be placed to detect top surface protrusions in a lateral direction, with no detectors placed to detect protrusions in the longitudinal direction. In such a case, due to the large number of lateral detectors, any protrusions in the top surface are likely to be detected, and thus longitudinal direction detectors are not likely to provide additional information. Similarly, a single detector may be positioned to monitor the top surface as the pallet is moved into the structural test station. This single detector may be positioned to continuously monitor the top surface as the pallet is moved beneath the sensor. If a protrusion breaks a beam associated with the detector, a signal is generated indicating a defect in the top surface.

Figure 19:
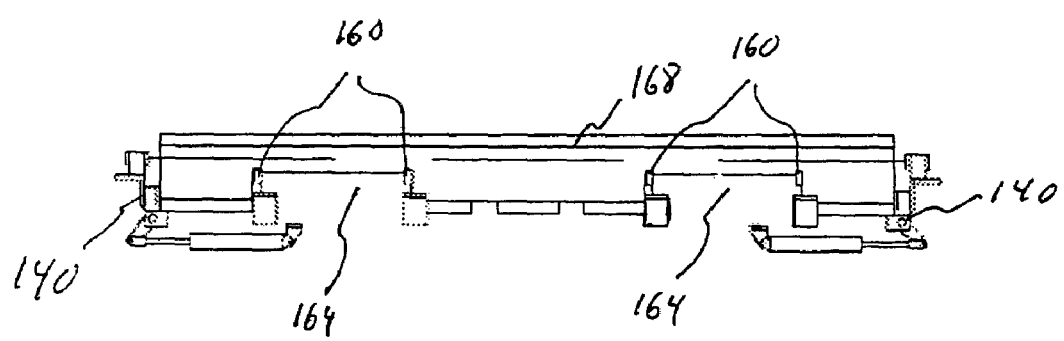
FIG. 19 is a side elevation view of forklift slot obstruction inspection sensors of an embodiment of the invention.
Figure 20:
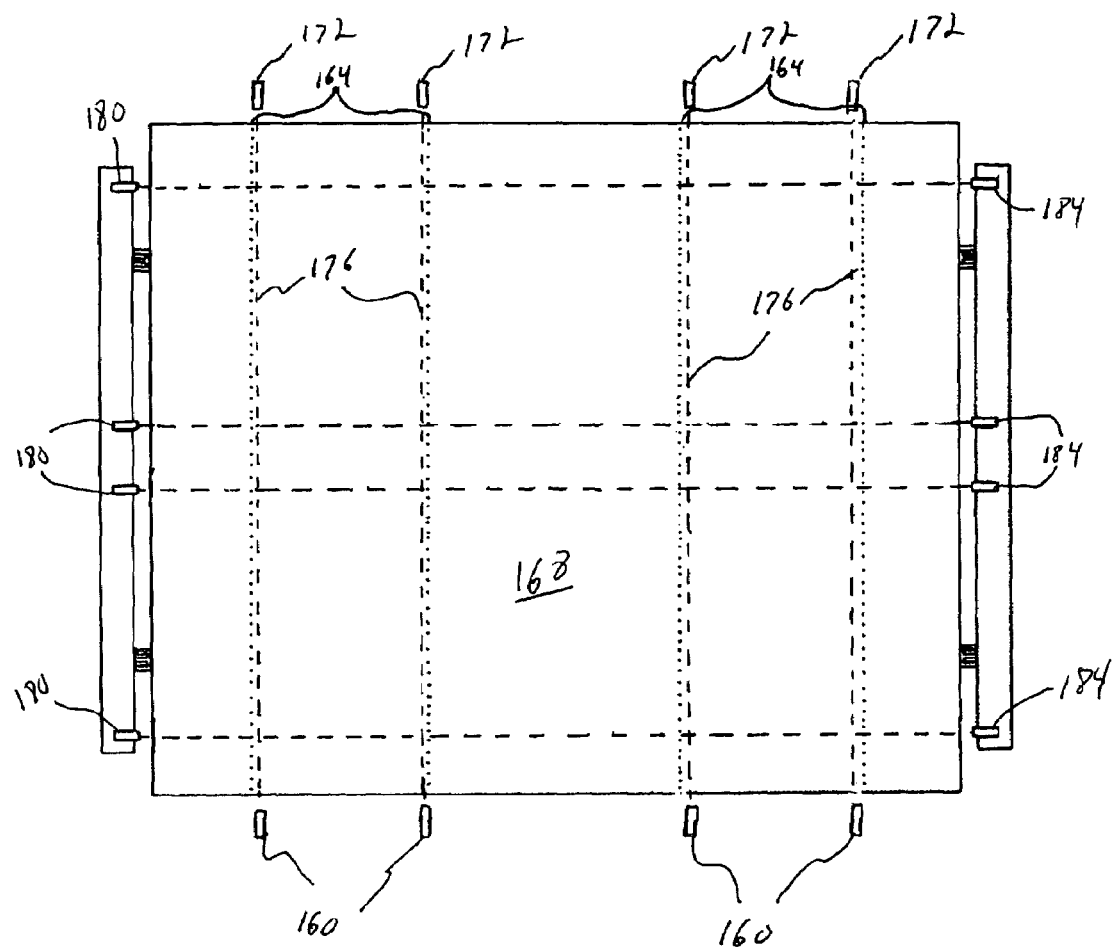
FIG. 20 is a top plan view of forklift slot obstruction inspection sensors of an embodiment of the invention.

Referring now to FIGS. 19-20, a forklift slot obstruction test of an embodiment of the present invention is now described. In the embodiment of FIG. 19, the structural test station 22 includes additional optical sensors 160 to verify that forklift slots 164 are not obstructed. In this embodiment, a pallet 168 is secured with clamps 140, and the optical sensors 160 are positioned such that an obstruction in one or both of the forklift slots 164 is detected. In this embodiment, four optical sensors 160 are used, one for each edge of both forklift slots 164. In this embodiment, the optical sensors 164 are positioned to detect any protrusions along the path of the optical sensor that extend into the forklift slots 164 greater than ¼ inch. In the embodiment of FIGS. 19-20, the side edges of the forklift slots 164 are used to detect lateral protrusions into the forklift slots 164. If no protrusions are detected with the optical sensors 160, there is a relatively high degree of confidence that no protrusions are present. As described above, the void check station 18 may be assumed to have detected any damage to the top surface of the pallet 168 that may cause a protrusion into one or both forklift slots 164 from the top.

In one embodiment, similarly as described above, optical detectors 160 are beam sensors having an associated emitter and receiver pair 160, 172 placed opposite each other, illustrated in FIG. 20. Each optical sensor emitter 160 generates a beam 176, that is received at the receiver 172. If any portion of the forklift slot 164 that is along a beam 176 path protrudes into the plane of the beam 176, the optical emitter/receiver pair 160, 172 associated with the blocked beam 176 will generate an electrical signal indicating a defect in the forklift slot 164. Similarly as described above, and as will be understood, any type of appropriate detector may be used to detect protrusions in the forklift slots, including, but not limited to, laser detectors, CCD detectors, and other optical detectors covering the ultraviolet, visible, and infrared portions of the electromagnetic spectrum. Furthermore, the number of optical detectors 160 used may be adjusted based upon the application. For example, a relatively large number of optical detectors may be placed to detect protrusions both along the edges of the forklift slots 164 and also detect protrusions from the top surface into the forklift slots 164. In another embodiment, illustrated in FIG. 20, the structural test station 22 also verifies that no protrusions are present in longitudinal forklift slots in addition to the lateral forklift slots 164. In this embodiment, additional optical sensor emitters 180 and associated receivers 184 are used to detect any protrusions into longitudinal forklift slots.

Figure 21:
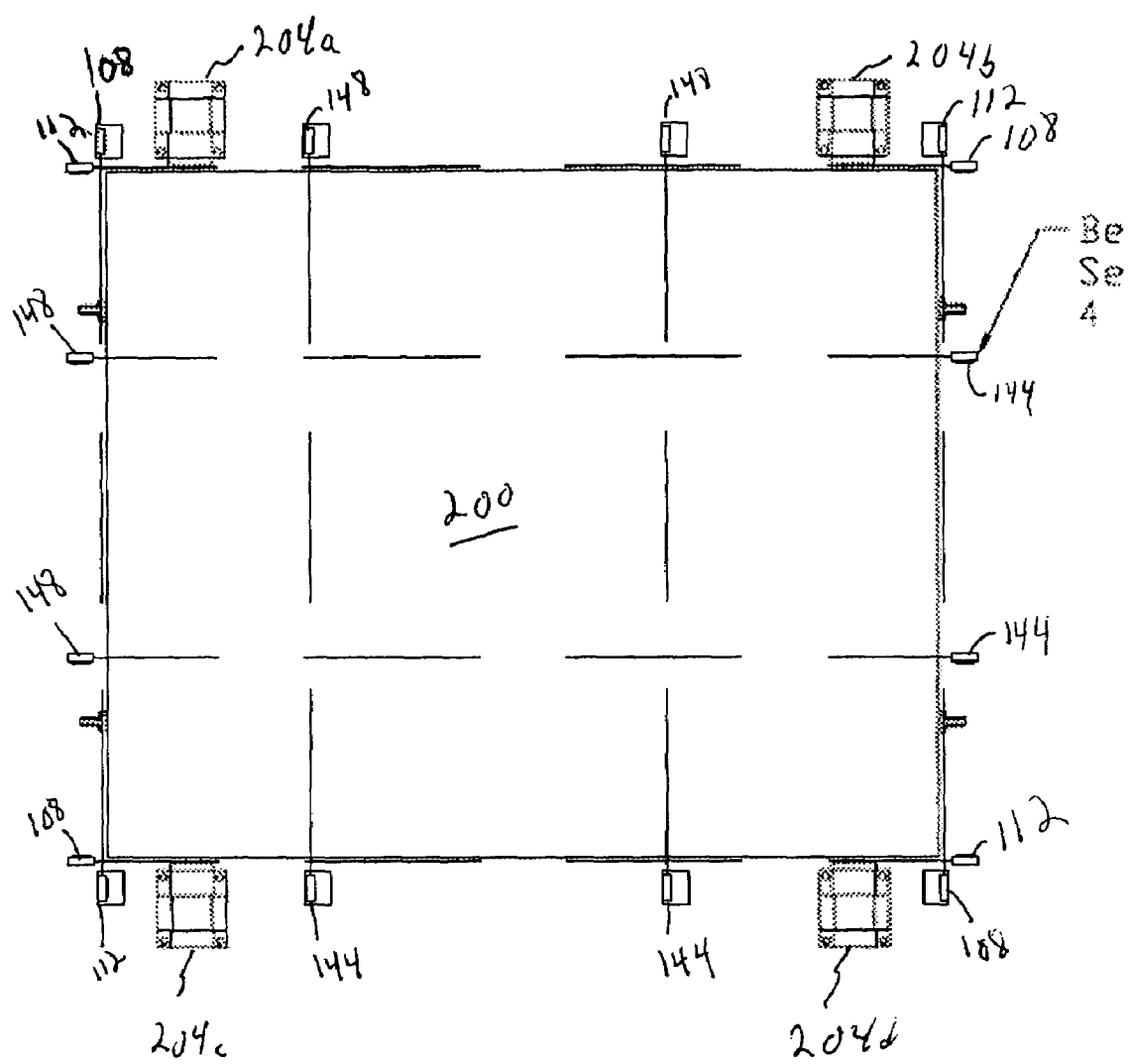
FIG. 21 is a top plan view of a twist load test station of an embodiment of the invention.

Referring now to FIG. 21, a stress test of an embodiment of the invention is now described. In this embodiment, a pallet 200 is subjected to a twist load test. In this embodiment, the pallet is secured into the structural test station 22 using dog clamps 140 as described with respect to FIG. 18. When secured, the pallet 200 is subjected to a torque that is applied by pneumatic actuators 204a, 204b, 204c, and 204d. In an embodiment, two of the pneumatic actuators 204a and 204d, are actuated to apply 500 pounds of force to alternate corners of the pallet 200. During the application of the twisting force, movement in the pallet 200 is detected using optical sensors 108 and reflectors 112 in the manner as described with respect to FIGS. 13-16. In this manner, if the pallet 200 has any movement greater than ¼ inch it is detected with the optical sensors 108. Following the application of force from pneumatic actuators 204*a* and 204*d*, the other pneumatic actuators 204*b* and 204*c* are actuated to apply 500 pounds of force to the pallet 200. Optical sensors 108 detect any movement in the pallet 200 during the application of the force from the pneumatic actuators 204*b*, 204*c*. In this embodiment, if any movement is detected in the optical sensors 108, a signal is generated indicating that the pallet 200 is to be rejected.

In this embodiment, 500 pounds of force is selected in order to give a high confidence that the pallet 200 is able to withstand torques and twisting forces that may be applied to the pallet during typical transport. As will be understood, the amount of force applied by pneumatic actuators 204 may be adjusted based on the application and the load that is expected to be carried by the pallet 200. For example, if the pallet 200 is expected to carry a load weighing only 100 pounds, a much lower force may be applied by the pneumatic actuators 204 while still giving a high level of confidence that the pallet 200 will not fail when transporting the load. Alternatively, if the pallet 200 is expected to carry a relatively heavy load, more force may be applied by the pneumatic actuators 204 in order to give a sufficiently high level of confidence that the pallet 200 will not fail during transport. In addition to optical sensors 108, in one embodiment optical sensor emitters 144 and receivers 148 as described with respect to FIG. 17 are also used to detect any changes in the top surface of the pallet 200 that are ¼ inch or more along the path of the optical sensor emitter/receiver pair 144, 148. In this manner, if a portion of the top surface buckles upward it may be detected by the optical sensors 144, 148.

Figure 22:
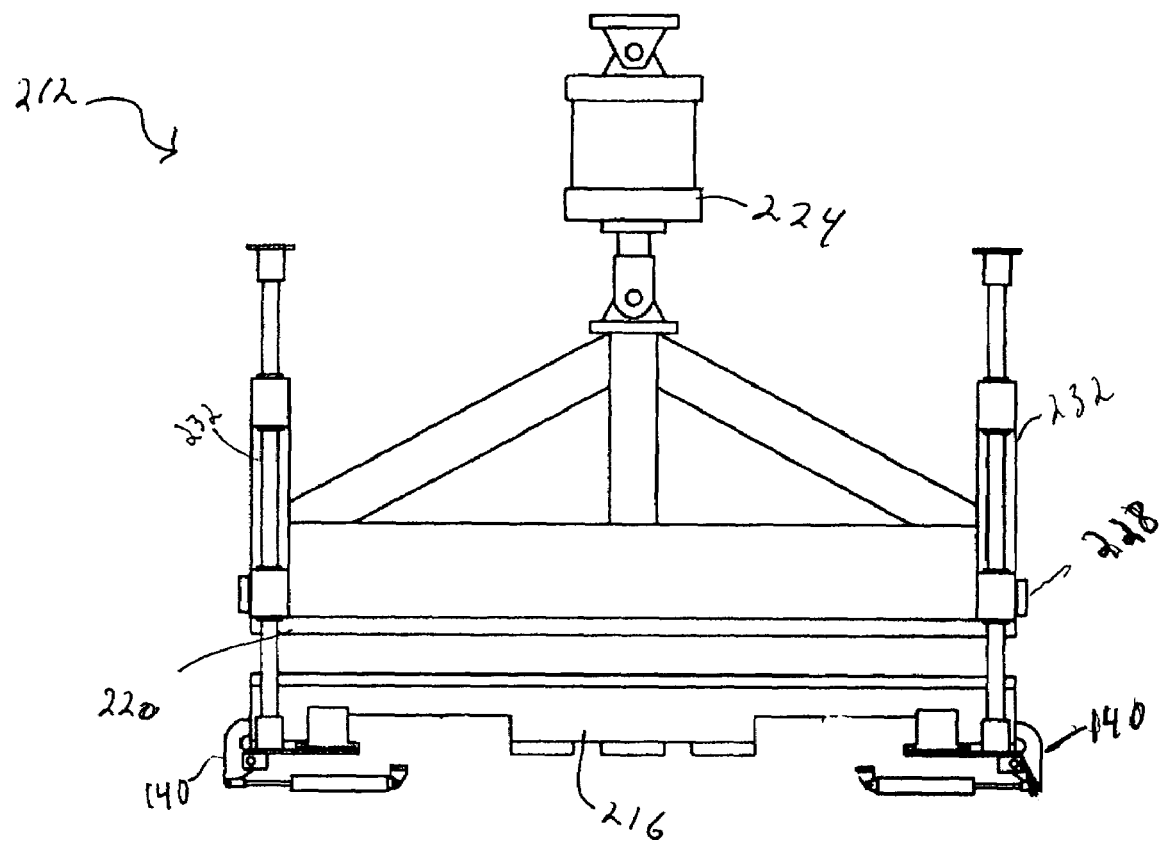
FIG. 22 is an elevation view of top load test inspection station of an embodiment of the invention.

Referring now to FIG. 22, a load test of an embodiment is now described. In this embodiment, the structural test station 22 includes a load test fixture 212 that applies a load to the top surface of a pallet 216. In this embodiment, the pallet 216 is secured in place with dog clamps 140 in a manner as described in FIG. 18. A platen 220 is mounted to a load actuator 224. When actuated, the load actuator 224 applies a load to the platen 220 causing the platen 220 to contact the top surface of the pallet 216 and transfer the load to the pallet. A height sensor 228 detects movement in the platen 220 that is greater than a preset amount. In one embodiment, the height sensor 228 detects movement of greater than ¼ inch from the point at which the platen 220 first contacts the pallet 216 top surface. If such movement is detected, it provides an indication that the pallet 216 may not support a load during transport. In one embodiment, the load actuator 224 applies 4000 pounds of force to the platen 220. As will be understood, the amount of force applied to platen 220 may be selected to be any amount of force sufficient to provide confidence that the pallet will support the intended load. In the embodiment of FIG. 22, the platen 220 is coupled to guide rails 232 that guide the platen 220 when moved up and down relative to the pallet 216.

Figure 23:
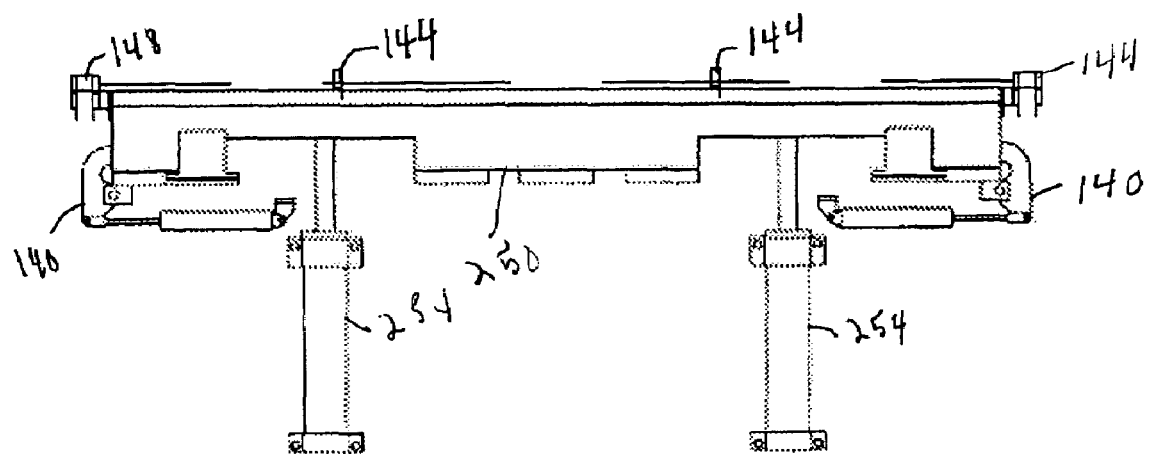
FIG. 23 is an elevation view of vertical deck board load test inspection station of an embodiment of the invention.

Referring now to FIG. 23, a top surface load test of an embodiment is now described. In this embodiment, the structural test station 22 includes a vertical load test that applies a load to the top surface of a pallet 250. The pallet 250 is secured in place with dog clamps 140 in a manner as described in FIG. 18, and subjected to a load applied by vertical load actuators 254. Optical sensor emitters 144 and receivers 148 as described in FIG. 18 are used to detect movement in the pallet 250 top surface. In this manner, if a portion of the top surface of the pallet 250 move as a result of the load applied by vertical load actuators 254, the optical detector pairs 144, 148 generate a signal indicating that a failure in the top surface occurred as a result of the vertical load. In one embodiment, the vertical load actuators 254 apply 500 pounds of force to the top surface of the pallet 250. As will be understood, the amount of force may be selected according to pallet requirements for particular applications.

Figure 24:
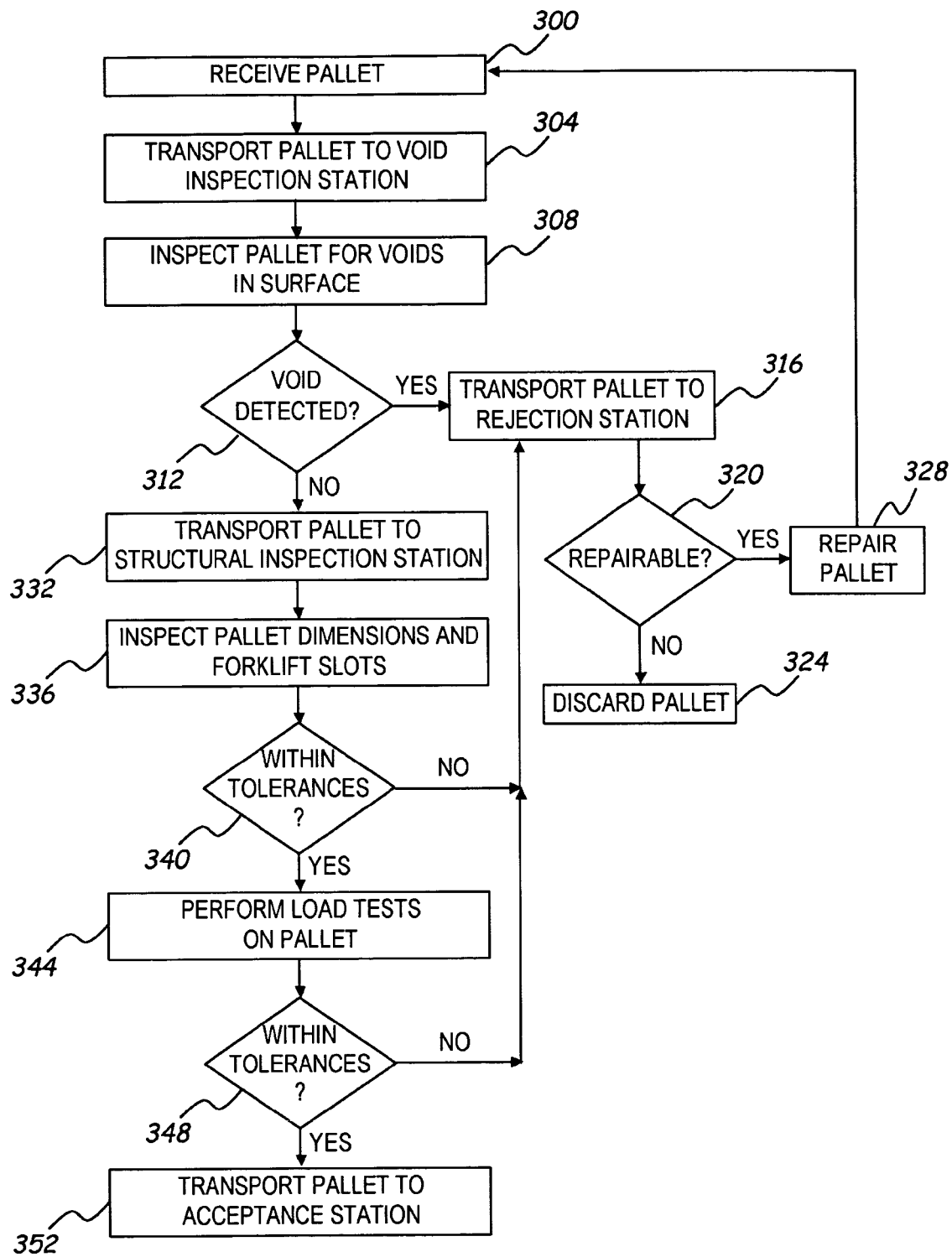
FIG. 24 is a flow chart illustration of the operational steps for inspecting a pallet of an embodiment of the invention.

Referring now to FIG. 24, the operational steps for inspecting a pallet of an embodiment of the present invention are now described. Initially, as indicated at block 300, the pallet is received. At block 304, the pallet is transported to the void inspection station. As mentioned previously, the pallet may be transported to the void inspection station in any number of ways, including a conveyer belt, rollers, and air pressure to name but a few. The pallet is then inspected for voids in the pallet top surface, as indicated at block 308. When inspecting the pallet, as described previously, the pallet is secured in place by clamps and a plurality of contact sensors are contacted to the surface of the pallet to determine if any voids greater than a predetermined size are present in the surface of the pallet. As also mentioned above, the surface inspection may also be performed by other inspection devices such as, for example, optical imaging of the pallet surface with a CCD sensor and analysis of the optical image to determine the presence or absence of voids or irregularities in the top surface.

At block 312, it is determined if a void was detected in the top surface of the pallet. If a void is detected, the pallet is transported to the rejection station, as indicated at block 316. At block 320, it is determined if the pallet is repairable. If the pallet is not repairable, it is discarded as indicated at block 324. If it is determined that the pallet is repairable, the pallet is repaired at block 328, and the operations beginning at block 300 are repeated. If at block 312 a void is not detected, the pallet is transported to the structural inspection station, as noted at block 332. At block 336, the pallet is inspected for proper dimensions and the forklift slots are inspected for obstructions. It is determined, at block 340, if the pallet is within dimensional tolerances. As discussed previously, dimensional tolerances for one embodiment are ¼ inch, and if a pallet has any protrusions that extend beyond about ¼ inch from a nominal dimension along the pallet sides, the pallet top surface, or the pallet forklift slots, the pallet is determined to be outside of acceptable tolerances. If a pallet is not within tolerances, the pallet is transported to the rejection station, as noted at block 316, and the operational steps associated with pallet repair are performed.

If the pallet is within tolerances at block 340, load tests are performed on the pallet, as indicated at block 344. At block 348, it is determined if the pallet is within dimensional tolerances during the load tests. As discussed above, such load tests may include a twist load test, a vertical deck board load test, and a top load test. As discussed previously, dimensional tolerances for one embodiment are ¼ inch, and a pallet is determined to be outside of acceptable tolerances if a portion of the pallet extends beyond about ¼ inch from a nominal dimension along the pallet sides or the pallet top surface, or if the pallet top surface drops beyond about ¼ inch below the nominal height, the pallet is determined to be outside of acceptable tolerances. If a pallet is not within tolerances at block 348, the pallet is transported to the rejection station at block 316, and the operational steps associated with pallet repair are performed. If the pallet is within tolerances at block 348, the pallet is transported to the acceptance station. As will be understood, the order of the operational steps described with respect to FIG. 24 may be modified, one or more of the steps may be combined, and/or one or more of the operational steps may be broken into several steps. Furthermore, one or more of the operational steps may be omitted for pallets in various applications that may only be concerned with a subset of the inspections described. For example, a repaired pallet that has passed the void check inspection may only be inspected for dimensional tolerances and load bearing capability. Similarly, even if a pallet fails the void inspection, the pallet may be inspected in the dimensional inspections and load tests in order make a determination as to whether the pallet may be repaired. Numerous other modifications will be recognized by one of skill in the art.

While the invention has been particularly shown and described with reference to a preferred embodiment thereof, it will be understood by those skilled in the art that various other changes in the form and details may be made without departing from the spirit and scope of the invention.

What is claimed is:

1. A pallet inspection apparatus, comprising:
   a mounting plate operable to be positioned in proximity to a pallet;
   a plurality of detectors mounted to said mounting plate and, when said mounting plate is in proximity to a pallet, operable in analyzing at least a portion of a surface of a pallet and generating an electrical indication of a state of each of said plurality of detectors; and
   a signal generator electrically connected to said plurality of detectors and operable to receive each of said electrical indications and generate a signal indicative of a defective pallet when said electrical indications indicate that there is a defect in the pallet surface;
   wherein said plurality of detectors is arranged in a two-dimensional array comprising a first row, a second row, and a third row with said second row located between said first row and said second row and with said second row located immediately adjacent to said first row and said second row;
   wherein said first row comprising a first detector of said plurality of detectors, said second row comprising second and third detectors of said plurality of detectors, and said third row comprising a fourth detector of said plurality of detectors;
   wherein a first line extending between said first and fourth detectors traverses and is substantially perpendicular to a line between said second and third detectors.

2. The pallet inspection apparatus, as claimed in claim 1, further comprising:
   a pallet input conveyer operable to receive a pallet to be inspected and transport the pallet to a location for inspection; and
   at least first and second clamp members located on opposite sides of said conveyer and in alignment with said mounting plate, wherein at least one of said first and second clamp members is operable to engage a pallet and align the pallet in a predetermined position relative to said mounting plate.

3. The pallet inspection system, as claimed in claim 1, wherein said mounting plate is operable to move in relation to the pallet to substantially simultaneously engage at least a portion of said detectors with a surface of a pallet.

4. The pallet inspection system, as claimed in claim 1, further comprising: a plurality of sensors that are operable in determining if a pallet has dimensions that are out of tolerance.

5. The pallet inspection system, as claimed in claim 4, wherein said plurality of sensors define a rectangle and are operable in detecting if a pallet is out of square.

6. The pallet inspection system, as claimed in claim 4, wherein said plurality of sensors are operable in detecting an obstruction in a forklift slot of a pallet.

7. The pallet inspection system, as claimed in claim 4, wherein said plurality of sensors are operable in detecting a protrusion from a top surface of the pallet.

8. The pallet inspection system, as claimed in claim 4, further comprising:
   at least first and second actuators for engaging alternate corners of a pallet, and wherein said plurality of sensors are operable in detecting if a pallet is out of square when said actuators engage alternate corners of the pallet.

9. The pallet inspection system, as claimed in claim 4, wherein said inspection station further comprises:
   an actuator located to engage a bottom portion of a top surface of a pallet;
   a clamp operable to secure a pallet from moving when said actuator engages a bottom portion of a top surface of a pallet; and
   wherein said plurality of sensors are operable in detecting protrusions from the top surface when the actuator is engaged with the bottom portion of the top surface.

10. The pallet inspection system, as claimed in claim 1, further comprising:
    an actuator; and
    a platen, operably interconnected and movable by said actuator, for engaging a top surface of a pallet; and
    a sensor operable in detecting a change in height of the pallet when said platen is engaged with the top surface.

11. A pallet inspection apparatus comprising:
    a mounting plate operable to be positioned in proximity to a pallet;
    a plurality of detectors mounted to said mounting plate and, when said mounting plate is in proximity to the pallet, operable to analyze at least a portion of a surface of the pallet and generate an electrical indication of a state of said detector; and
    a signal generator electrically connected to said plurality of detectors and operable to receive said electrical indication and generate a signal indicative of a defective pallet when said electrical indication indicates that there is a defect in the pallet surface;
    wherein said plurality of detectors each comprise a probe operable to telescope within an inductive sensor, said probe biased within said inductive sensor such that when said probe contacts the surface, said probe is forced against said bias into said inductive sensor, and wherein said inductive sensor generates an electrical indication in response thereto.

12. A pallet inspection system comprising:
    a mounting plate operable to be positioned in proximity to a pallet;
    a plurality of detectors mounted to said mounting plate and, when said mounting plate is in proximity to the pallet, operable to analyze at least a portion of a surface of the pallet and generate an electrical indication of a state of said detector; and a signal generator electrically connected to said plurality of detectors and operable to receive said electrical indication and generate a signal indicative of a defective pallet when said electrical indication indicates that there is a defect in the pallet surface;

wherein said mounting plate substantially completely covers the surface of the pallet, and wherein said detectors are arranged on said mounting plate to detect defects in the surface of the pallet that are greater than a predetermined size.

13. The pallet inspection system, as claimed in claim 12, wherein said predetermined size is about 2 square inches.

* * * * *